No. 867,809. PATENTED OCT. 8, 1907.
A. C. EASTWOOD.
SERIES PARALLEL CONTROLLER.
APPLICATION FILED SEPT. 6, 1906.

6 SHEETS—SHEET 1.

WITNESSES:

INVENTOR
A. C. Eastwood
by Pierce & Barber
ATTORNEYS

No. 867,809. PATENTED OCT. 8, 1907.
A. C. EASTWOOD.
SERIES PARALLEL CONTROLLER.
APPLICATION FILED SEPT. 6, 1906.
6 SHEETS—SHEET 2.
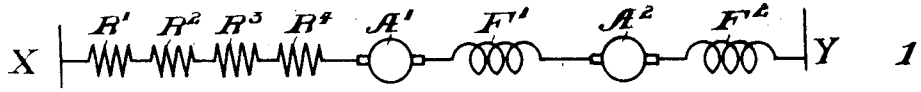
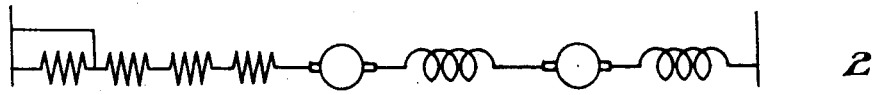
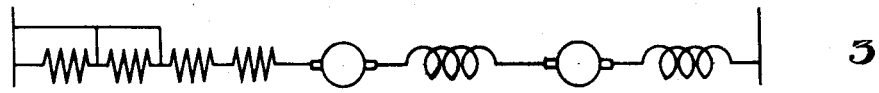
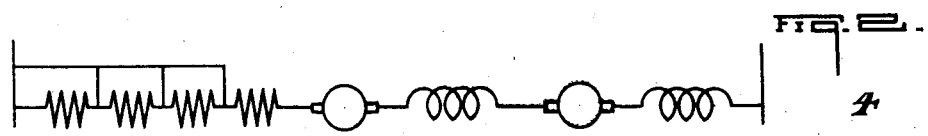
FIG. 2.
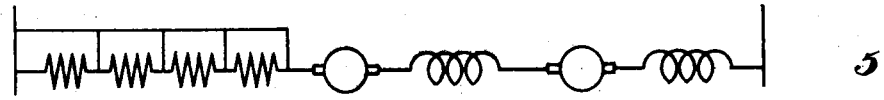
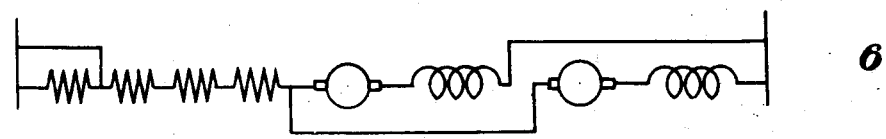
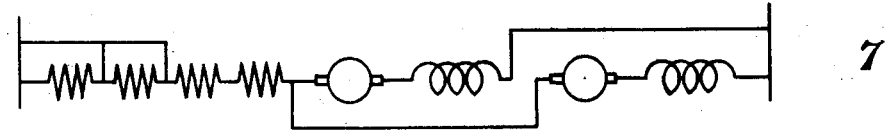
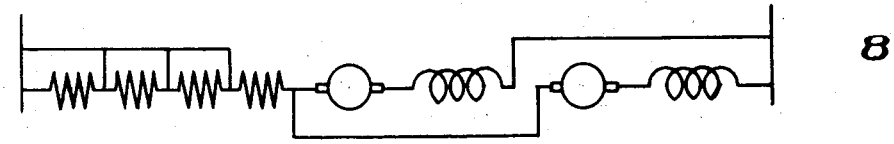
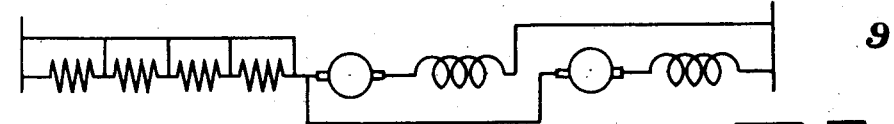
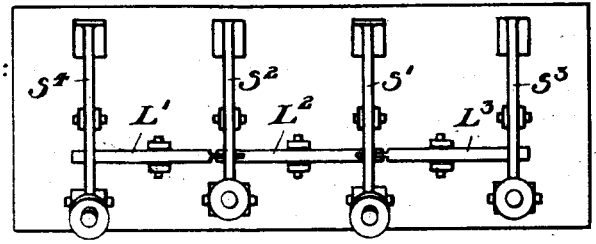
FIG. 7.
WITNESSES:
INVENTOR
A. C. Eastwood
by
Pierce & Barber
ATTORNEYS

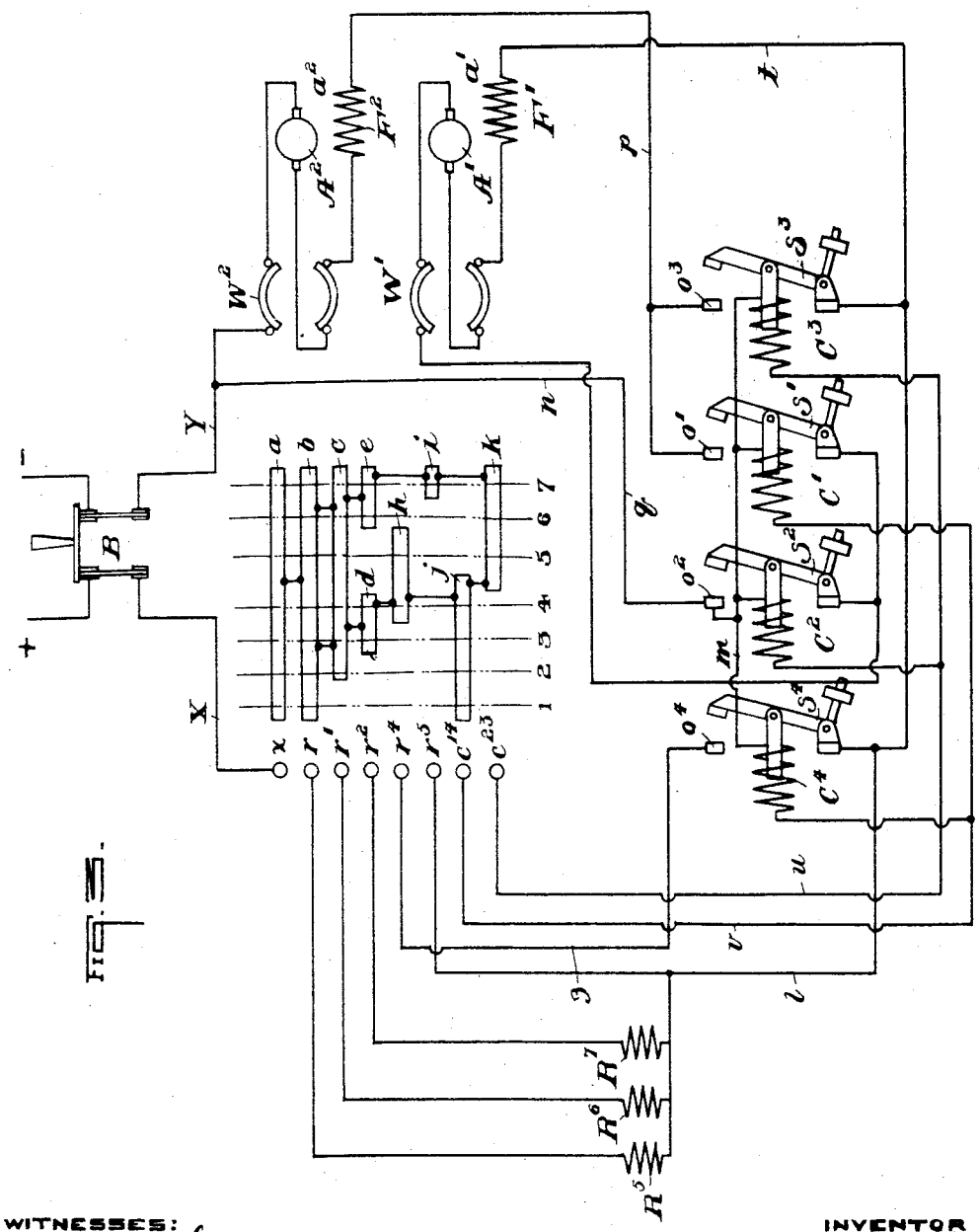

No. 867,809. PATENTED OCT. 8, 1907.
A. C. EASTWOOD.
SERIES PARALLEL CONTROLLER.
APPLICATION FILED SEPT. 6, 1906.
6 SHEETS—SHEET 4.
FIG. 4.
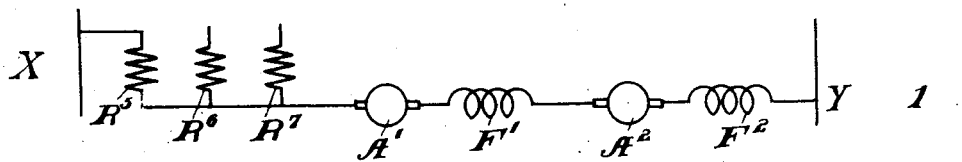
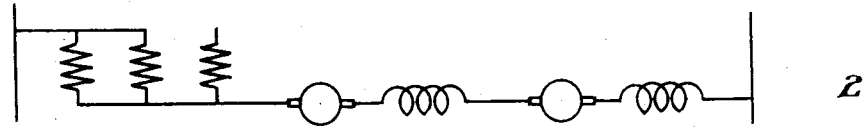
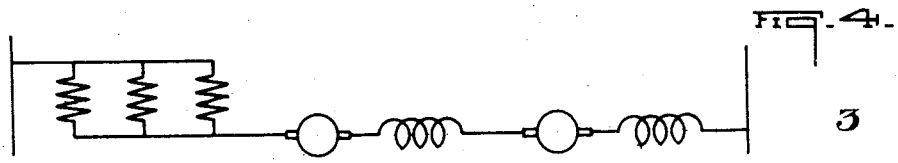
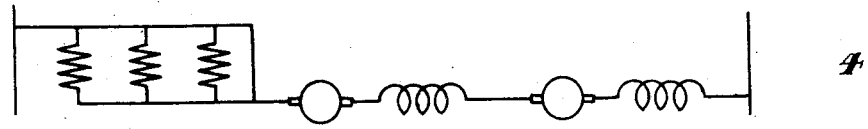
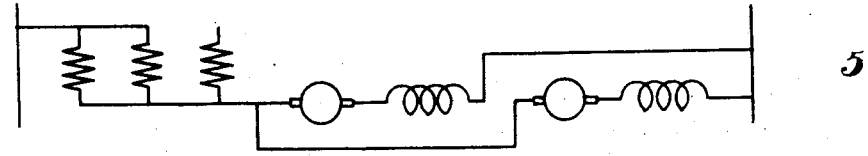
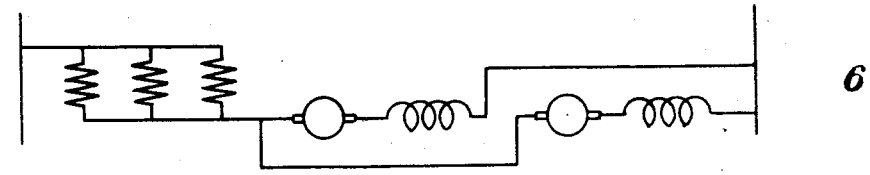
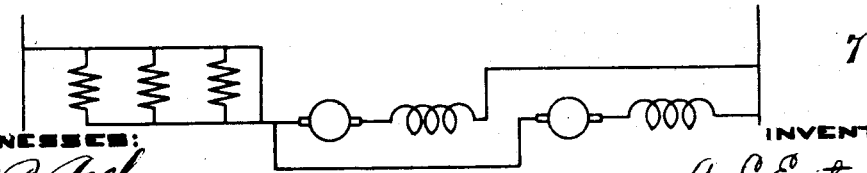
WITNESSES:
J. P. Affleman,
Elva Stanek.
INVENTOR
A. C. Eastwood
by
Pierce & Barber
ATTORNEY No. 867,809. PATENTED OCT. 8, 1907.
A. C. EASTWOOD.
SERIES PARALLEL CONTROLLER.
APPLICATION FILED SEPT. 6, 1906.
6 SHEETS—SHEET 6.
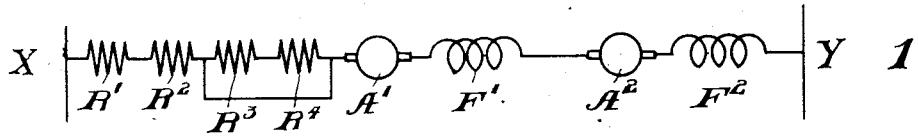
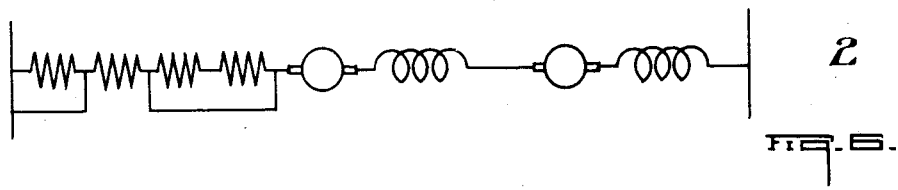
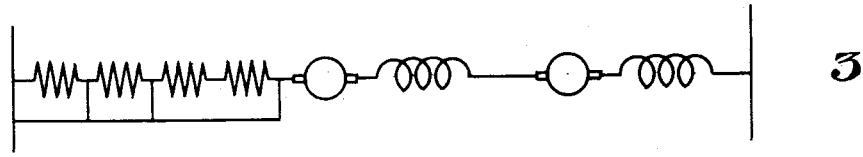
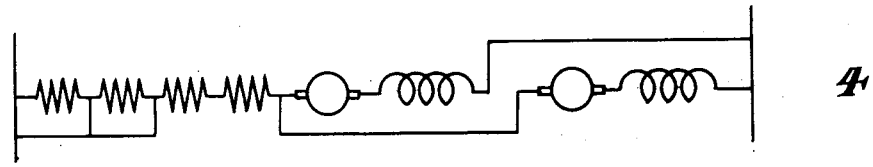
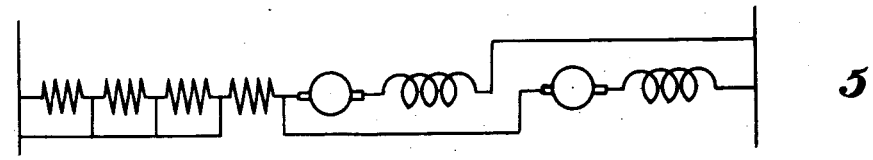
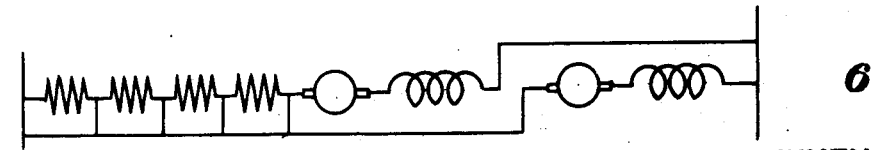
FIG. 6.
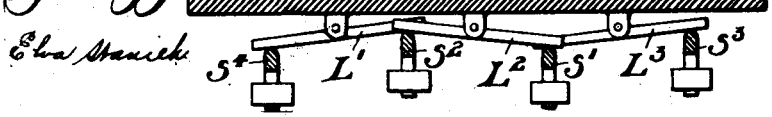
FIG. 8.
WITNESSES: INVENTOR
A. C. Eastwood
by
Pierre N Barber
ATTORNEYS

UNITED STATES PATENT OFFICE.

ARTHUR C. EASTWOOD, OF CLEVELAND, OHIO.

SERIES-PARALLEL CONTROLLER.

No. 867,809.

Specification of Letters Patent.

Patented Oct. 8, 1907.

Application filed September 6, 1906. Serial No. 333,563.

*To all whom it may concern:*

Be it known that I, ARTHUR C. EASTWOOD, a citizen of the United States, residing at Cleveland, in the county of Cuyahoga and State of Ohio, have invented or discovered new and useful Improvements in Series-Parallel Controllers, of which the following is a specification.

My invention relates to improvements in series-parallel controllers, particularly in that type of controllers in which the circuit is opened in changing the motor connections from series to parallel.

One of the objects of my improvements is to secure a practically instantaneous change in motor connections, and absolute reliability in inserting the necessary resistance for limiting the current, when the motors are connected in parallel, by means of switches which cannot close until the requisite resistance is in circuit. In introducing the resistance in the parallel relation, I prefer to accomplish this by opening the switch which has previously short circuited the resistance rather than by closing a switch to introduce the resistance in circuit.

Figure 1:
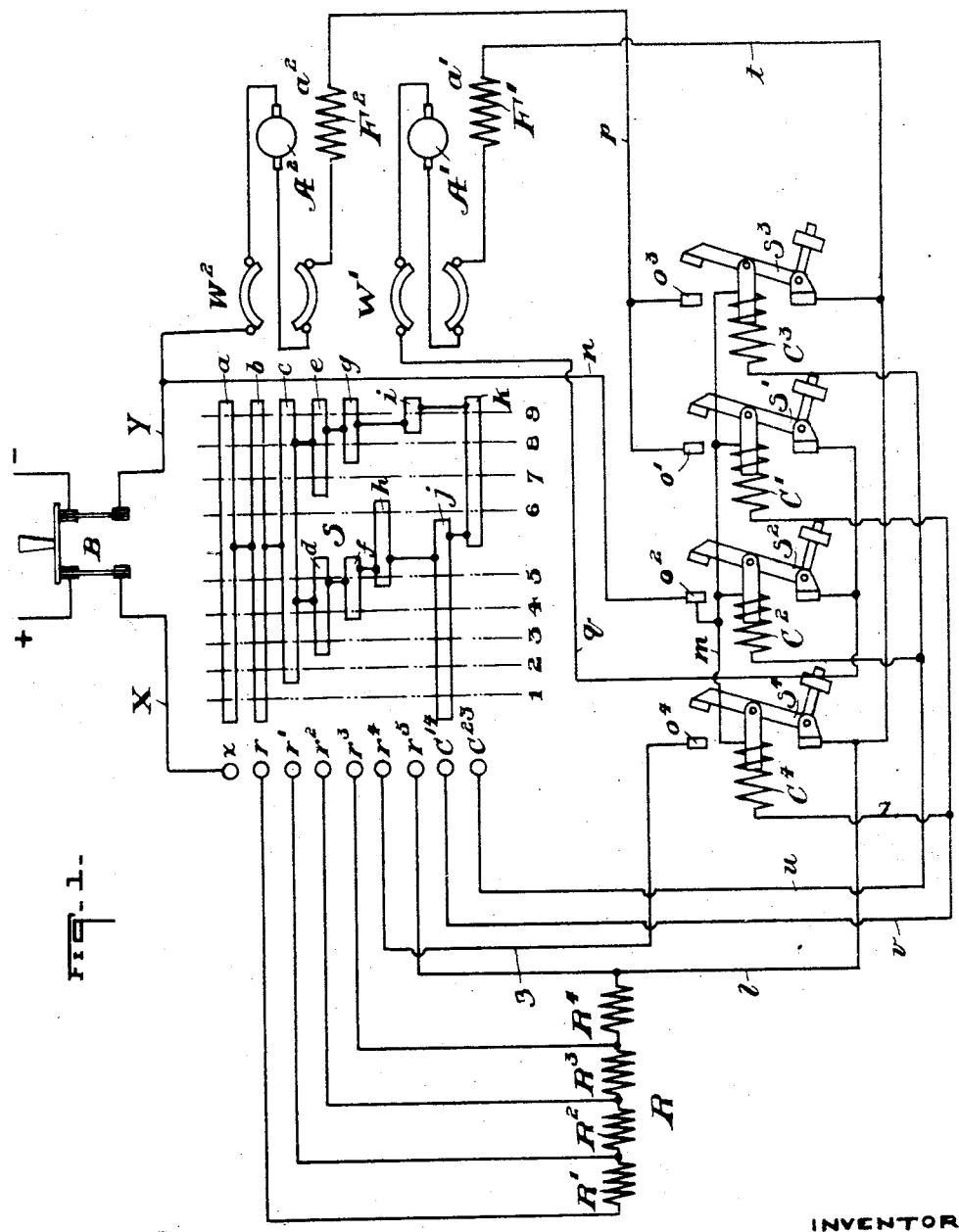
Figure 5:
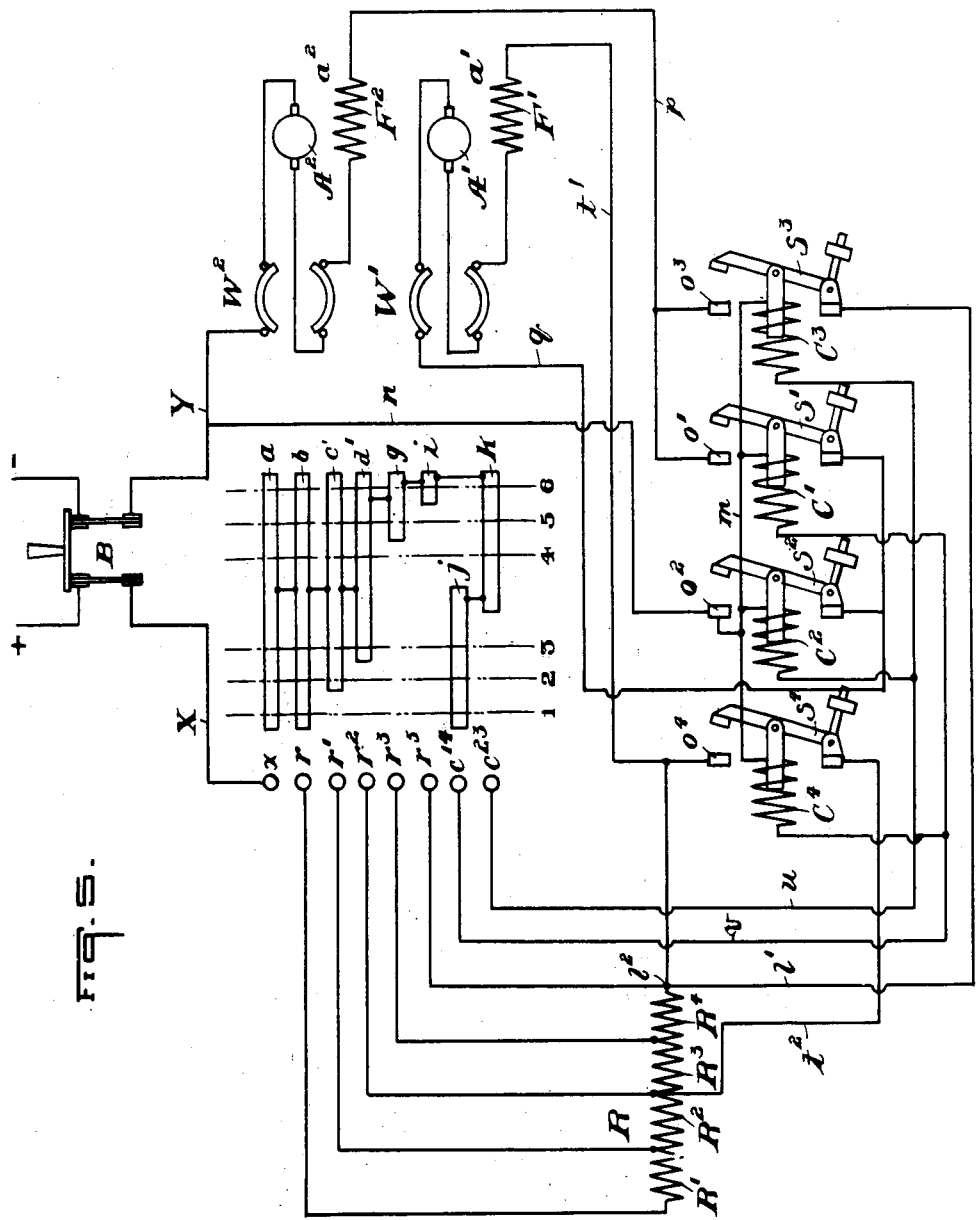

Referring to the accompanying drawings which form a part of this specification, Figures 1, 3, and 5 are diagrammatic views of three forms of my invention and Figs. 2, 4 and 6 are diagrams of the circuits of Figs. 1, 3, and 5, respectively, for the various positions of the controller drum or handle. Fig. 7 is an elevation and Fig. 8 a section showing the manner of interlocking the switches.

Referring first to Figs. 1 and 2, B represents a double-pole switch which connects the positive and negative supply wires to the wires X and Y, respectively. The wire X leads to the contact-finger $x$ of the hand-controlled switch S, preferably of the drum type, and the wire Y leads through the reversing switch $W^2$, the armature $A^2$ and the field $F^2$ of the motor $a^2$, and the wire $p$ to the fixed contacts $o^1$ and $o^3$ of the switches $S^1$ and $S^3$, controlled by the electro-magnets $C^1$ and $C^3$. The wire Y is connected by the wire $n$ to the fixed contact $o^2$ of the switch $S^2$, controlled by the electro-magnet $C^2$. The contact fingers $r^1$, $r^2$, $r^3$ and $r^5$, are connected to the respective sections $R^1$, $R^2$, $R^3$ and $R^4$ of the resistance R, the said sections being in series. The section $R^4$ is connected by the wire $l$ to the wire $t$, which leads from the switches $S^3$ and $S^4$ through the field $F^1$ and the armature $A^1$ of the motor $a^1$, and the reversing switch $W^1$ to the switches $S^1$ and $S^2$. The contact finger $r^4$ is connected by the wire $z$ to the fixed contact of the switch $S^4$, controlled by the electro-magnet $C^4$. The contact-finger $C^{14}$ is connected by the wire $v$ to the windings of the magnets $C^1$ and $C^4$, and the contact finger $C^{23}$ is connected by the wire $u$ to the windings of the magnets $C^2$ and $C^3$. The windings of the magnets $C^3$ and $C^1$ are connected by the wire $m$, to which are connected the fixed contact $o^2$ and the windings of the magnets $C^1$ and $C^2$.

$a, b, c, \ldots k$ represent contact strips or rings on the face of the controller-switch S, and $1, 2, 3, \ldots 9$ represent the several steps or positions of the afore mentioned contact-fingers on the switch S, at the various positions of the controller. Supposing the contact-fingers to be on the line 1, the positive current passes from the switch B through the wire X, the contact-finger $x$, the strips $a$, $b$, $c$, $d$, $f$, $h$, and $j$, the contact finger $c^{14}$, the wire $v$, the windings $C^1$ and $C^4$, the wire $m$, the contact $o^2$, the wire $n$, the wire Y, and the switch B to the negative feed wire. The energization of the magnets $C^1$ and $C^4$ causes the switches $S^1$ and $S^4$ to close on their contacts $o^1$ and $o^4$.

The closing of the switch $S^1$ closes a second circuit, as follows: From the positive main through the switch B, the wire X, the contact-finger $x$, the strips $a$ and $b$, the contact finger $r$, all the sections of the resistance R, the wire $l$, the wire $t$, the motor $a'$, the reversing switch $W^1$, the wire $q$, the switch $S^1$, the contact $o^1$, the wire $p$, the field $F^2$, one-half of the reversing switch $W^2$, the armature $A^2$, the remaining half of the switch $W^2$, the wire Y, and the switch B to the negative main. In this position of the switch S, both motors are in series with the whole resistance.

In the second, third, and fourth positions, the connections are as in the first position except that the resistance sections $R^1$, $R^2$, and $R^3$, have been cut out in the usual manner.

In the fifth position, the remaining resistance section $R^4$, has been cut out by the strip $h$ which contacts with the finger $r^4$, the current passing from the strip $f$ (whence in the fourth position it passed to the finger $r^3$) to the strip $h$. The current passes from the finger $r^4$ through the wire $z$, the contact $o^4$, the switch $S^4$ (which is already closed, as explained) the wire $t$, the motor $a^1$, the switch $S^1$, the wire $p$, the motor $a^2$, the wire Y and the switch B to the negative main. In this position the whole resistance has been shunted by a new wire and not by the wire $l$ and the finger $r^5$, the motors still being in series.

In passing from the fifth to the sixth position, the contact finger $C^{23}$ comes in contact with the strip $k$, before the finger $C^{14}$ leaves the strip $j$. The electro-magnets $C^2$ and $C^3$ are, therefore, energized before the magnets $C^1$ and $C^4$ are deënergized and the switches $S^2$ and $S^3$ tend to close before switches $S^1$ and $S^4$ open. They are, however, prevented from so doing by the interlocking levers shown in Figs. 7 and 8, in which figures it will readily be seen that the centrally pivoted lever L' engages the arms of switches $S^2$ and $S^4$, lever $L^2$ engages the arms of switches $S^1$ and $S^2$, and the lever $L^3$ engages the arms of switches $S^1$ and $S^3$. It will further be readily understood that, with the arrangement shown, switch $S^2$ cannot close while either switch $S^1$ or $S^4$ are closed, nor can switch $S^3$ close while switch $S^1$ is closed, and vice versa.

In passing from position 5 to position 6, as soon as finger $C^{23}$ engages contact ring $k$, switches $S^2$ and $S^3$ tend to close. The coils of switches $S^1$ and $S^4$ are, however, energized and remain so until finger $C^{14}$ leaves contact with ring $j$. The arms of switches $S^2$ and $S^3$, therefore, pull upon the arms of the interlocking levers which interlock them with switches $S^1$ and $S^4$ but cannot close till switches $S^1$ and $S^4$ open. They are unable to pull the switches $S^1$ and $S^4$ open, for, these switches being already closed, have the magnetic circuits of their actuating electro-magnets practically closed, while a considerable air-gap exists in the magnetic circuit of the actuating magnets of switches $S^2$ and $S^3$. During that period of revolution of the drum of the controller S, which corresponds to the overlapping of rings $j$ and $k$, the switches $S^2$ and $S^3$ are straining at the interlocking levers in an endeavor to close. As soon, however, as contact ring $j$ leaves contact with finger $C^{14}$, coils $C^1$ and $C^4$ are deenergized and switches $S^2$ and $S^4$ instantly close. It is evident then that the closure of switches $S^2$ and $S^3$ must take place concurrently with the opening of switches $S^1$ and $S^4$, the switches $S^2$ and $S^3$ being in the act of closing while switches $S^1$ and $S^4$ are in the act of opening and the period of time consumed in changing the motor connections will be exceedingly brief.

In passing from position 6 to position 5, it will be evident that switches $S^1$ and $S^4$ will close concurrently with the opening of switches $S^2$ and $S^3$. At the precise moment when the strip $j$ leaves the contact finger $C^{14}$, the magnets $C^1$ and $C^4$ are deënergized, and the switches $S^2$ and $S^3$ instantly close, the current then passing from the contact finger $x$ through the strips $a$, $b$, $c$, $d$, $f$, $h$, $j$ and $k$; the contact finger $C^{23}$, the wire $u$, the windings $C^2$ and $C^3$, the wire $m$, the contact $o^2$, the wires $n$ and Y to the negative main. This circuit closes the switches $S^2$ and $S^3$. Simultaneously with the closing of these two switches (the controller now being in the sixth position, the motor circuit is closed, which is as follows: From the positive main the current flows through the switch B, the contact finger $x$, the controller-strips $a$, $b$, and $c$, the contact-finger $r^1$, the resistance sections $R^2$, $R^3$, and $R^4$, the wires $l$ and $t$, the motor $a^1$, the wire $q$, the switch $S^2$, the contact $o^2$, the wires $n$ and Y and the switch B to the negative main. From the wire $t$, a circuit parallel to that through the motor $a$ passes through the switch $S^3$, the contact $o^3$, the wire $p$, the motor $a^2$ to the said wire Y. In this position of the controller S, the motors are in parallel and the resistance R is all in circuit but the section $R^1$.

In the seventh, eighth and ninth positions of the controller N, the resistance sections $R^2$, $R^3$ and $R^4$ are successively short circuited in an evident manner.

Fig. 2 shows the circuits for the nine positions of the controller shown on Fig. 1.

It will be understood that, even though the finger $r^4$, which serves to short circuit the resistance in the final series position of the controller, is in contact with the strip $h$ at the instant of transition from series to parallel, the short-circuit through the wire $z$ is simultaneously opened by the opening of the switch $S^4$, and owing to the overlapping of the series and parallel strips $j$ and $k$ the opening of the switch $S^4$ is coincident with the closure of the switches $S^2$ and $S^3$. It will thus be seen that my invention provides positive means for inserting resistance at precisely the time required.

Referring now to Fig. 3, the construction is the same as in Fig. 1, except that the finger $r^3$ and its corresponding controller strips $f$ and $g$ and one resistance section have been omitted, and the resistances have been connected in parallel. There are only seven controller positions shown, those corresponding to the fourth and eighth positions in Fig. 1, being omitted. The circuits are the same as on Fig. 1 except as follows: In the first position the motor circuit passes from the finger $r$ through only one resistance section, which is so proportioned to permit the required current to pass, for example, as much as passes through the resistance R of Fig. 1; in the second position a second parallel path for the current is provided through the strip $c$, the finger $r^1$, and the resistance section $R^6$, whereby an increased current is supplied to the motors; in the third position, a third parallel path is provided for the current through the strip $d$, the finger $r^2$, and the resistance section $R^7$, whereby a still larger current passes to the motors. In position 4, the resistance is entirely shunted as in the fifth position of Fig. 1, through the wire $z$. In passing from the fourth, or in the last series position of the controller to the fifth position, or the first parallel position thereof; the changes of the circuits and the operation of the apparatus are as in Fig. 1. The sixth and seventh positions respectively cut in the parallel resistance section $R^7$, the sections $R^5$ and $R^6$ being already in parallel in the motor circuit by reason of the opening of the short circuit path $z$ when the switch $S^4$ opened which occurred when the strip $j$ left the finger $c^{14}$, causing the magnets $C^1$ and $C^4$ to be deënergized.

The connections at each position of the controller are graphically shown on Fig. 4.

Referring now to Fig. 5, the finger $r^4$ of Fig. 1 has been omitted together with the strip $h$, the contact $o^4$ being directly connected at $l^2$ to the circuit passing from the finger $r^5$. The switch $S^4$ is connected to the middle of the resistance R by the wire $l^2$, and the switch $S^3$ to the end of the resistance R at $l^2$. The strips $a$, $b$, $c$, $g$, $i$, $j$, and $k$ are as in Fig. 1, the strip $d$ being the same as the strips $d$ and $e$ of Fig. 1 made continuous. In Fig. 5 there are only six controller positions, the transition from the series to the parallel arrangement of the motors occurring between the third and fourth position.

In the first position the switches $S^1$ and $S^4$ are closed and the switches $S^2$ and $S^3$ open as in Figs. 1 and 3. Current then passes from the wire X through the finger $x$, the strips $a$, $b$, $c$, $d^1$, $g$, $i$, $k$, and $j$, the finger $c^{14}$, the wire $v$, the windings $C^1$ and $C^4$, the wire $m$, the contact $o^2$, the wire $n$ to the wire Y as in the first position on Figs. 1 and 3, causing the closing of the switches $S^1$ and $S^4$, as already explained. The motor circuit for this position of the controller passes from the strip $b$ through the finger $r$, the resistance sections $R^1$ and $R^2$ the wire $t^2$, the wire $t^1$, the motor $a^1$, the wire $q$, the switch $S^1$, the contact $o^1$, the wire $p$, the motor $a^2$, to the wire Y, where it joins the other circuit. The motors are now in series with each other and one-half of the resistance, that is, the sections $R^1$ and $R^2$.

In the second position of the controller the section $R^1$ of the resistance is short-circuited by the strip $c^1$ and the corresponding fingers $r^1$ and the third position of the controller, the resistance section $R^2$ is short-circuited by the strip $d^1$ and the finger $r^2$. In the latter position the resistance is entirely short-circuited through the finger $r^2$ and the wire $t^2$.

In passing from the third to the fourth position of the controller, the circuits remain as they were in the third position until the strip $j$ leaves the finger $c^{14}$, at which time the circuit connections are changed as in Figs. 1 and 3 to the parallel arrangement, the circuit from the finger $r^2$ then passing through the resistance sections $R^3$ and $R^4$ to the wire $t^1$, owing to the opening of the switch $S^4$ which short-circuited the said sections in the series condition of the motors. The current from the resistance sections divides at $l^2$, one branch passing to the motor $a^1$ by way of the wire $t^1$ and the other to the motor $a^2$ by way of the wire $l^1$, the switch $S^3$ and the wire $p$. The current from the motor $a^2$ passes directly to the wire Y, but that from the motor $a^1$ passes to the wire Y by way of the wire $q$, the switch $S^2$ and the wire $n$.

In the fifth position of the controller the strip $g$ contacts with the finger $r^3$, which short circuits the section $R^3$, leaving the section $R^4$ still in series with the motors, which are in parallel.

In the sixth position of the controller the section $R^4$ of the resistance is short-circuited by the strip $i$ and the finger $r^5$.

The various circuit connections corresponding to the positions of the controller are illustrated diagrammatically on Fig. 6.

It will be noted that in each of the arrangements illustrated in Figs. 1, 3, and 5, in accelerating the motors they are first connected in series with the maximum amount of resistance. This resistance is then reduced step by step until the motors are operated in series with all of the resistance short circuited. The transition from series to parallel is then made instantaneously, the closure of the parallel switches being coincident with the opening of the series switch and also coincident with the opening of a switch which removes a short-circuit from the requisite amount of resistance for giving the proper speed on the first parallel step of the controller. There can be no uncertainty as to the time of inserting the requisite resistance, which is inserted by the opening of a switch rather than by the closure of a switch. The transition from series to parallel is, therefore, not only made instantaneously but smoothly, since the resistance inserted by the opening of the switch $S^4$ may be so proportioned that the increments of increase in speed secured in passing from the last series step to the first parallel step will be the same as that secured between preceding steps of the controller.

I claim—

1. In a series-parallel controller, the combination of a resistance divided into parts, means for short circuiting one part of the resistance while the motors are connected in series, means for short circuiting another part of the resistance to increase the speed of the motors while in the series position, means for changing the connections of the motors from series to parallel, means for concurrently opening the short circuit around the first portion of the resistance, and means for again short circuiting the resistance.

2. In a series-parallel controller, a resistance, means for throwing a short circuit around a portion of the resistance while the motors are connected in series and means for opening the short circuit around the said portion of the resistance concurrently with the change of the motor connections from series to parallel.

3. In a controller for two or more motors, the combination of a resistance for limiting the flow of current to said motors, a power operated series switch for connecting the motors in series, a power operated resistance switch for short circuiting a portion of the resistance when said motors are connected in series, a power operated parallel switch for connecting the motors in parallel, and means for energizing the closing mechanism of the parallel switch prior to deënergizing the closing mechanism of the series switch and the resistance switch.

4. In a controller for two or more motors, the combination of a resistance for limiting the flow of current to the motors, a power operated series switch for connecting said motors in series, a power operated resistance switch for short circuiting a portion of the resistance when the motors are connected in series, a power operated parallel switch for connecting the motors in parallel, means for energizing the closing mechanism of the parallel switch prior to deënergizing the closing mechanism of the series switch and the resistance switch, and means for preventing the parallel switch from closing while the series switch and the resistance switch are closed.

5. In a series parallel controller in which the circuit is opened in changing the motor connections from series to parallel, a resistance and means for inserting the resistance in series with the motors concurrently with the opening of the circuit in passing from series to parallel.

6. In a series parallel controller in which the circuit is opened in changing the motor connections from series to parallel, the combination of a series switch, a parallel switch or switches, a resistance, and means for inserting all or a portion of the resistance in series with the motors concurrently with the opening of the series switch and the closure of the parallel switch or switches.

7. In a series parallel controller, the combination of a series switch for connecting the motors in series, a parallel switch for connecting the motors in parallel, a resistance, means for short circuiting the resistance when the series switch is closed, means acting concurrently with the opening of the series switch for inserting a portion of the resistance in series with the motors, a switch for connecting the motors in parallel and means for reducing and finally short circuiting said portion of the resistance when the motors are connected in parallel.

8. In a system of series parallel control, means for connecting the motors in series with a resistance, means for reducing the resistance and finally short circuiting the same, means for opening the short circuit and simultaneously connecting the motors in parallel.

9. In a series parallel controller, a resistance, an operating switch, a switch mechanism for opening the series circuit, means for inserting the resistance in the series circuit prior to the establishing of the parallel circuit and means for opening said series circuit, inserting the resistance, and connecting the motors in parallel in a period of time independent of the speed at which the operating switch is moved.

10. In a series parallel controller, the combination of a resistance, an operating switch for reducing and finally short circuiting the resistance while the motors are connected in series and for controlling the amount of resistance in circuit when the motors are connected in parallel, and means independent of said operating switch for timing the insertion of said resistance prior to connecting the motors in parallel.

11. In a series parallel controller for two or more motors, the combination of a power actuated series switch, a power-actuated parallel switch or switches, a power actuated resistance switch, and means for interlocking the action of said power actuated switches so that, when the series switch and the resistance switch are opening, the parallel switch is closing and vice versa.

12. In a series parallel controller for two or more motors, a series switch for connecting the motor windings in series, a parallel switch for connecting the motor windings in parallel, a resistance, a resistance switch for short-circuiting said resistance, a controlling switch for regulating the amount of said resistance in circuit with said motors and for controlling the action of said series switch, said parallel switch, and said resistance switch, the connections being such that said parallel switch tends to close prior to the opening of said series switch and said resistance switch, and means for preventing said parallel switch from closing while either the said series switch or the said resistance switch is closed.

13. In a series parallel controller, a resistance, a resistance switch for short-circuiting said resistance, a parallel switch, and means for causing said parallel switch in closing to tend to open said resistance switch.

14. In a series parallel controller, a resistance, a resistance switch for short-circuiting said resistance, a series switch, a parallel switch, and means whereby the parallel switch in closing tends to open said resistance switch and said series switch.

15. In a series parallel controller, a resistance, a controlling switch for regulating the amount of said resistance in circuit, a resistance switch for short-circuiting said resistance, a series switch, a parallel switch, and means whereby the tendency of said parallel switch to close is governed by said controlling switch and the time of its closure is governed by the resistance switch.

16. In a series parallel controller, a resistance switch, a switch for short-circuiting said resistance, a parallel switch, means for preventing either of said switches from closing while the other is closed, and means tending to close either of said switches prior to the opening of the other.

17. In a series parallel controller, a resistance, an operating switch, and means whereby the connections of the motors are changed from the full series relation to parallel relation with said resistance in series with said motors, said change being made at a speed independent of the speed at which said operating switch is moved.

18. In a series parallel controller, a resistance, a resistance switch of the separately actuated type for short-circuiting said resistance, a parallel switch also of the separately actuated type, and a mechanical interlock whereby the parallel switch cannot close while the resistance switch is closed.

19. In a series parallel controller, a resistance, a resistance switch of the separately actuated type for short-circuiting said resistance, a parallel switch also of the separately actuated type, a mechanical interlock whereby the parallel switch cannot close while the resistance switch is closed, and means for energizing the closing mechanism of said parallel switch prior to deënergizing the closing mechanism of said resistance switch.

Signed at Cleveland this 29" day of Aug., 1906.

ARTHUR C. EASTWOOD.

Witnesses:
C. W. COMSTOCK,
J. E. WELLMAN.